US007506058B2

United States Patent
Donatelli et al.

(10) Patent No.: US 7,506,058 B2
(45) Date of Patent: Mar. 17, 2009

(54) METHOD FOR TRANSMITTING INFORMATION ACROSS FIREWALLS

(75) Inventors: Alex Donatelli, Rome (IT); Marco Lerro, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1237 days.

(21) Appl. No.: 10/285,999

(22) Filed: Oct. 31, 2002

(65) Prior Publication Data

US 2003/0123483 A1    Jul. 3, 2003

(30) Foreign Application Priority Data

Dec. 28, 2001   (EP)   .................. 01480154

(51) Int. Cl.
    *G06F 15/16* (2006.01)
(52) U.S. Cl. .................. 709/229; 709/238
(58) Field of Classification Search ........... 709/227, 709/229, 250, 238; 726/11, 12; 370/469
    See application file for complete search history.

(56) References Cited

U.S. PATENT DOCUMENTS

| | | | | |
|---|---|---|---|---|
| 5,257,369 A * | 10/1993 | Skeen et al. | ................ | 719/312 |
| 6,104,716 A * | 8/2000 | Crichton et al. | ............ | 370/401 |
| 6,385,649 B1 * | 5/2002 | Draves et al. | .............. | 709/224 |
| 6,754,712 B1 * | 6/2004 | Valencia | .................... | 709/227 |
| 6,874,030 B1 * | 3/2005 | Sheth et al. | ................ | 709/229 |
| 6,920,502 B2 * | 7/2005 | Araujo et al. | .............. | 709/229 |
| 7,117,267 B2 * | 10/2006 | Bavadekar | ................. | 709/230 |
| 7,139,811 B2 * | 11/2006 | Lev Ran et al. | ............ | 709/217 |
| 7,143,152 B1 * | 11/2006 | Elman et al. | ................ | 709/223 |
| 7,146,404 B2 * | 12/2006 | Kay et al. | ................... | 709/206 |
| 2001/0054157 A1 * | 12/2001 | Fukumoto | .................. | 713/201 |
| 2002/0073232 A1 * | 6/2002 | Hong et al. | ................. | 709/238 |
| 2002/0169740 A1 * | 11/2002 | Korn | ............................ | 707/1 |
| 2003/0126464 A1 * | 7/2003 | McDaniel et al. | .......... | 713/201 |
| 2004/0255043 A1 * | 12/2004 | Salo et al. | ................... | 709/236 |
| 2005/0086295 A1 * | 4/2005 | Cunningham et al. | ....... | 709/203 |

OTHER PUBLICATIONS

Castro, Miguel et al. "Scribe: A large-scale event notification system." Archived by the Internet Archive on Oct. 7, 2001: <http://web.archive.org/web/20011007045311/http://www.research.microsoft.com/~antr/SCRIBE/>.*
Rowstron, Antony et al. "Scribe: The design of a large-scale event notification infrastructure." Microsoft Research. Oct. 7, 2001.*
Brinkhoff, Lars. "GNU httptunnel." Archived by the Internet Archive on Oct. 2, 2000: <http://web.archive.org/web/20001002212930/http://www.nocrew.org/software.httptunnel.html>.*

* cited by examiner

*Primary Examiner*—Andrew Caldwell
*Assistant Examiner*—Christopher Biagini
(74) *Attorney, Agent, or Firm*—Stephen R. Tkacs; Stephen J. Walder, Jr.; Jeffrey S. LaBaw (57) ABSTRACT

A method provides a layered communication stack. A connection manager manages the actual transfer of data through a single point-to-point connection crossing a respective firewall. A sessions manager multiplexes multiple sessions over the connection. A routing manager exploits the sessions manager for building a routing table dynamically. A routed sessions manager implements routed sessions between two applications at opposite ends of the system; the routed sessions manager exploits the sessions manager to let the data navigate through the firewalls, and it exploits the routing manager to address the data correctly from source to destination.

14 Claims, 6 Drawing Sheets

METHOD FOR TRANSMITTING INFORMATION ACROSS FIREWALLS

FIELD OF THE INVENTION

The present invention relates to the field of computer networks, and in particular to a method and system for transmitting information across a plurality of firewalls.

BACKGROUND OF THE INVENTION

Networks implementing distributed data processing systems, and in particular the INTERNET, have attained a widespread diffusion in the last years. A major concern of organisations wishing to embrace the INTERNET as a way of conducting business is that of exposing their internal private network to the outside world. Several security issues are raised by this kind of applications, which involve attachment of the (secure) private network of the organisation to the largely uncontrolled environment of the INTERNET. Particularly, the organisation must be protected from intruders attempting to gain unauthorised access to the private network or attempting to compromise its operation.

Most security measures involve the use of a firewall. A firewall consists of hardware and/or software controlling the traffic between the INTERNET and the private network; all messages entering or leaving the private network pass through the firewall, which allows only certain traffic to transit as specified by a firewall administrator.

However, a firewall is only able to check the traffic between the two different networks, but it cannot prohibit unwanted connections within the private network. Therefore, the private network is typically connected to the INTERNET through an extension thereof, known as Demilitarised Zone (DMZ). The DMZ includes all the computers (such as web servers) that must be publicly accessible from the INTERNET. A first firewall separates the DMZ from the INTERNET, and a second firewall separates the private network from the DMZ. In this way, the web servers are protected from the INTERNET and they are taken apart from the internal network at the same time.

A more secure approach consists of providing multiple security zones (compartments or segments), which are protected from each other by corresponding firewalls. As a consequence, any security breach in one of the compartments is restricted within the attacked compartment and it does lead to a total compromise of the environment.

Communication between computers separated by multiple firewalls (for example located in two different compartments) is quite complex. This drawback is particularly acute when different protocols or technologies are used for the firewalls.

Moreover, no solution is known in the art for managing communications across the multiple firewalls in a manner that is transparent to a user.

SUMMARY OF THE INVENTION

In one illustrative embodiment, a method of transmitting information across a plurality of firewalls between a first computer and a second computer separated by the firewalls is provided. A relay computer is interposed between a pair of firewalls within the plurality of firewalls. The method comprises providing a communication stack with a plurality of layers on each computer, establishing a routed virtual session between a first application running on the first computer and a second application running on the second computer using a routed session manager layer. The second application registers for a unique service by creating an entry in a registration table controlled by a routed session manager layer at the second computer. Registering the second application comprises associating, in an application program interface in the second computer, a callback function to the service. The method further comprises creating an entry for the routed virtual session in a routed session table controlled by the routed session manager layer. The entry comprises a first routed session handle identifying the routed virtual session at the first computer, an identifier of the service implemented by the routed virtual session, a label identifying the second computer, and a second routed session handle identifying a routed virtual session implementing the routed virtual session in the second computer. The method further comprises opening, by the first application via an application program interface in the first computer, the routed virtual session thereby causing a corresponding open message comprising an identifier of the service to be transmitted to the second computer and requesting transmission of data from the first application using the routed virtual session, thereby causing a corresponding send message comprising the data and the identifier of the service to be transmitted to the second computer. The method further comprises implementing the routed virtual session through a communications session between two adjacent computers along a path from the first computer to the second computer using a connection manager layer underneath the routed session manager layer, breaking down data in the routed virtual session into a plurality of packets in a session managing layer underneath the routed session manager layer, and multiplexing, using the session manager layer, a plurality of virtual sessions on the communications session crossing a corresponding firewall such that the plurality of packets are available over time and the routed virtual session does not dominate the communications session.

In another illustrative embodiment, a method of transmitting information across a plurality of firewalls between a first computer and a second computer separated by the firewalls is provided. A relay computer is interposed between a pair of firewalls within the plurality of firewalls. The method comprises providing a communication stack with a plurality of layers on each computer and dynamically building a routing structure on each computer within the plurality of computers using a routing manager layer between the routed session manager layer and the session manager layer. The routing structure associates each adjacent computer with the plurality of computers reachable through the routing scheme. The routing scheme consists of a tree having a plurality of nodes including a root associated with a root computer, a plurality of leaves each one associated with an endpoint computer, and at least one intermediate node associated with a relay computer, each node different from the root having a single parent and each node different from a leaf having at least one child. Dynamically building the routing structure comprises upon activation of each computer collecting the routing structure from each child if active, updating the routing structure stored on the activated computer according to the collected routing structure, and propagating the updated routing structure from the activated computer along the tree up to the root if the parent is active. The method further comprises establishing a routed virtual session between a first application running on the first computer and a second application running on the second computer using a routed session manager layer, implementing the routed virtual session through a communications session between two adjacent computers along a path from the first computer to the second computer using a connection manager layer underneath the routed session manager layer, breaking down data in the routed virtual session into a plurality of packets in a session managing layer underneath the routed session manager layer, and multiplexing, using the session manager layer, a plurality of virtual sessions on the communications session crossing a corresponding firewall such that the plurality of packets are available over time and the routed virtual session does not dominate the communications session.

These and other features and advantages of the present invention will be described in, or will become apparent to those of ordinary skill in the art in view of, the following detailed description of the example embodiments of the present invention.

DETAILED DESCRIPTION OF THE PREFERRED EMBODIMENT

Figure 1A:
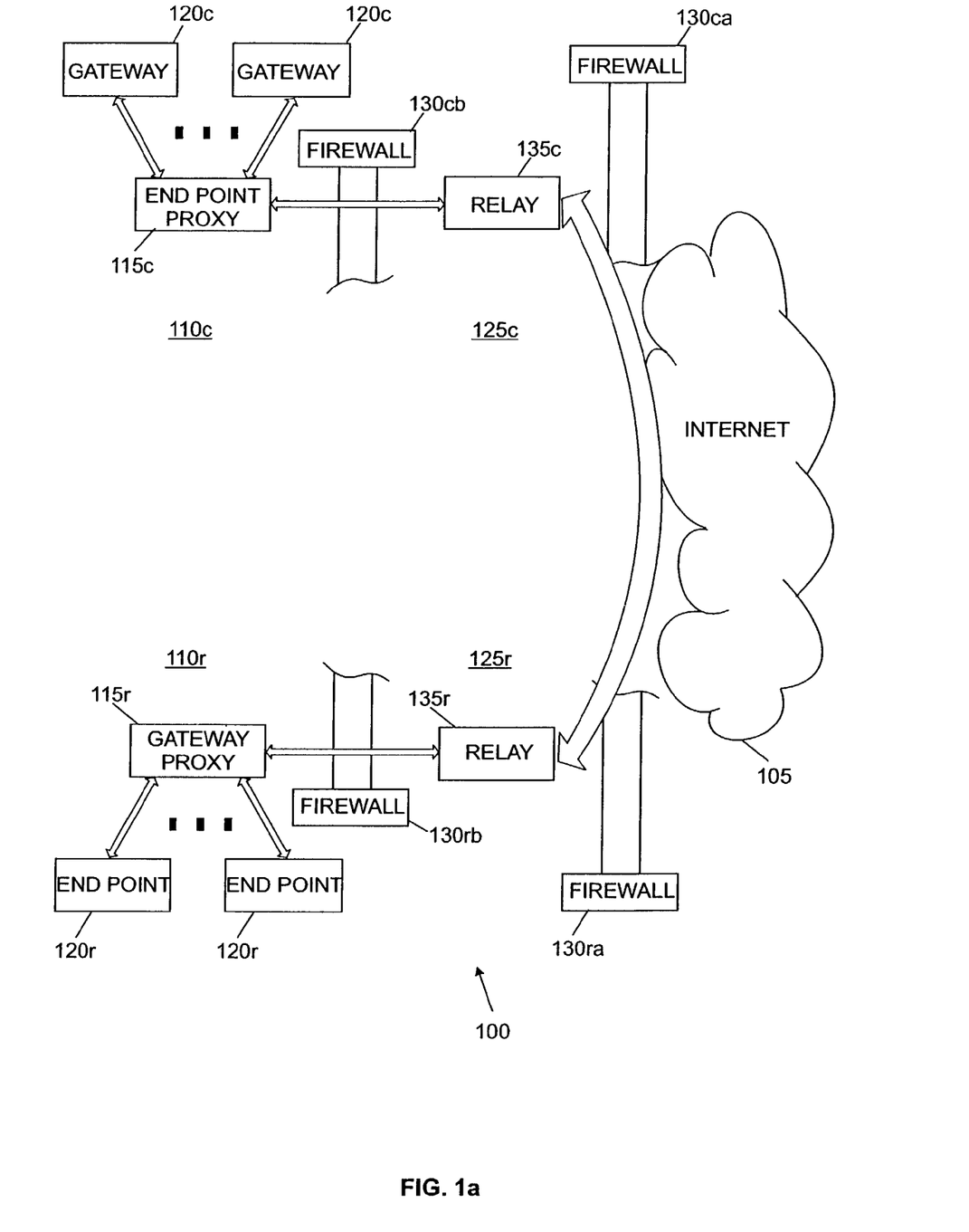
FIG. 1a depicts a data processing system in which the method of the invention can be used.

With reference in particular to FIG. 1a, a data processing system 100 that relies on the INTERNET 105 is depicted. The INTERNET 105 consists of a network including millions of computers connected to each other through public media. This structure allows an uncontrolled access to the network, so that the INTERNET 105 is open and unprotected, and then not trusted for its own nature.

A private network 110c in a central site of an organization interfaces with the INTERNET 105. The private network 110c implements a secure structure, which uses trusted communications lines (for example private lines belonging to the organisation), and it is then closed and protected. The private network 110c includes a server computer 115c, such as an endpoint proxy computer for one or more gateway computers 120c.

The private network 110c is connected to the INTERNET 105 through a DMZ 125c. The DMZ 125c is an internal line of defence of the private network 110c, which sits between the INTERNET 105 and the private network 110c. All the communications between the private network 110c and the INTERNET 105 pass through the DMZ 125c; in this way, the private network 110c cannot be accessed from the INTERNET 105 directly, in order to avoid exposing the private network 110c to attacks from the outside. The DMZ 125c is separated from the INTERNET 105 and from the private network 110c by a firewall 130ca and a firewall 130cb, respectively. A relay computer 135c in the DMZ 125c is directly coupled to the INTERNET 105 and to the endpoint proxy 115c by means of corresponding point-to-point connections that cross the firewalls 130ca and 130cb, respectively.

The organisation further has a remote branch office with a private network 110r; the private network 110r includes a client computer 115r, such as a gateway proxy computer for one or more endpoint computers 120r. The private network 110r is connected to the INTERNET 105 through a DMZ 125r; the DMZ 125r is separated from the INTERNET 105 and from the private network 110r by a firewall 130ra and a firewall 130rb, respectively. A relay computer 135r in the DMZ 125r is directly coupled to the INTERNET 105 and to the gateway proxy 115r by means of corresponding point-to-point connections that cross the firewalls 130ra and 130rb, respectively.

Each firewall 130ca, 130cb, 130ra, 130rb is a hardware and/or software system that is installed at a point where two networks with a different level of security meet (also known as choke point), and that enforces a security policy between the two networks; in this way, the firewall can protect the more secure network from attacks coming from the less secure network. All packets entering or leaving the more secure network pass through the firewall, which examines each packet and blocks those that do not meet specified security criteria.

The firewall further controls a connection policy between the two networks, which defines the way in which each connection is initiated. In a bi-directional initiation connection, the connection may be initiated on request by both networks. Conversely, in a unidirectional initiation connection the connection may be initiated on request only by a selected network, typically the more secure one; this ensures that the initiator of the connection is always trusted. The initiator periodically polls the less secure network, in order to process requests for connections from this network. In the example shown in the figure, both the connections across the firewalls 130ca and 130ra are bi-directional, whereas the connections across the firewalls 130cb and 130rb may be initiated only by the endpoint proxy 115c and by the gateway proxy 115r, respectively.

The system described above allows the endpoint proxy 115c in the central site and the gateway proxy 115r in the remote branch office to communicate between them in a secure manner. The communication is managed going through the INTERNET 105, across the firewalls 130cb, 130ca, 130ra and 130rb.

Figure 1B:
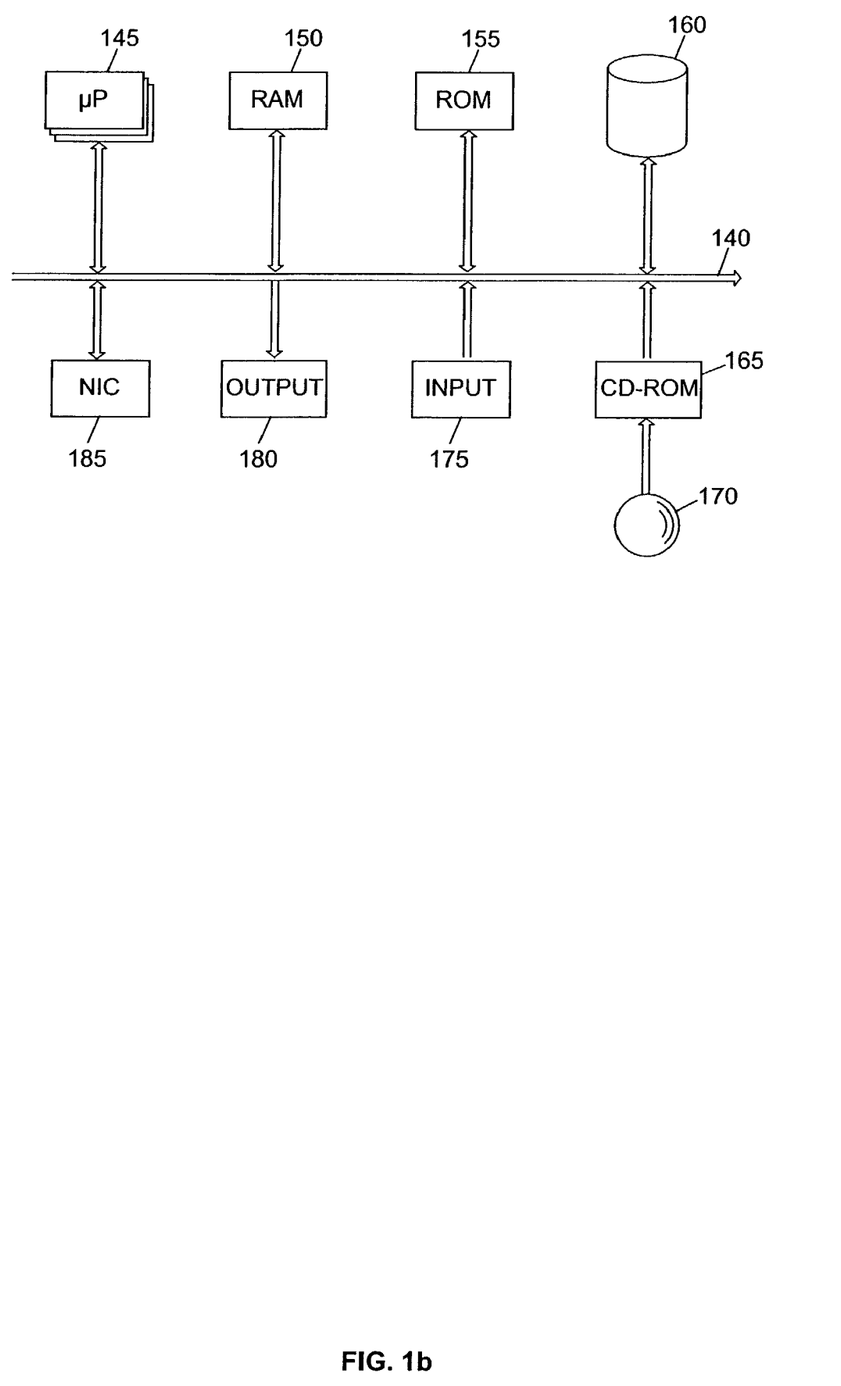
FIG. 1b is a schematic block diagram of a generic computer of the system.

As shown in FIG. 1b, a generic computer of the system (for example consisting of a mid-range computer) is formed by several units that are connected in parallel to a communication bus 140. In detail, multiple microprocessors (μP) 145 control operation of the computer, a RAM 150 is directly used as a working memory by the microprocessors 145, and a ROM 155 stores basic programs for a bootstrap of the computer. Several peripheral units are further connected to the bus 140 (by means of respective interfaces). Particularly, a bulk memory consists of a magnetic hard-disk 160 and a driver 165 for reading CD-ROMs 170. Moreover, the computer includes input devices 175 (for example consisting of a keyboard and a mouse), and output devices 180 (for example consisting of a monitor and a printer). A NIC 185 is used to control network communication.

Similar considerations apply if the system has another topology, if each computer is connected to a different number of adjacent computers, if the system is used for different applications, if the endpoint proxy and the gateway proxy are replaced with one or more equivalent computers, if a different number of firewalls is envisaged, if the computers have a different structure or include different units, and the like.

Figure 2A:
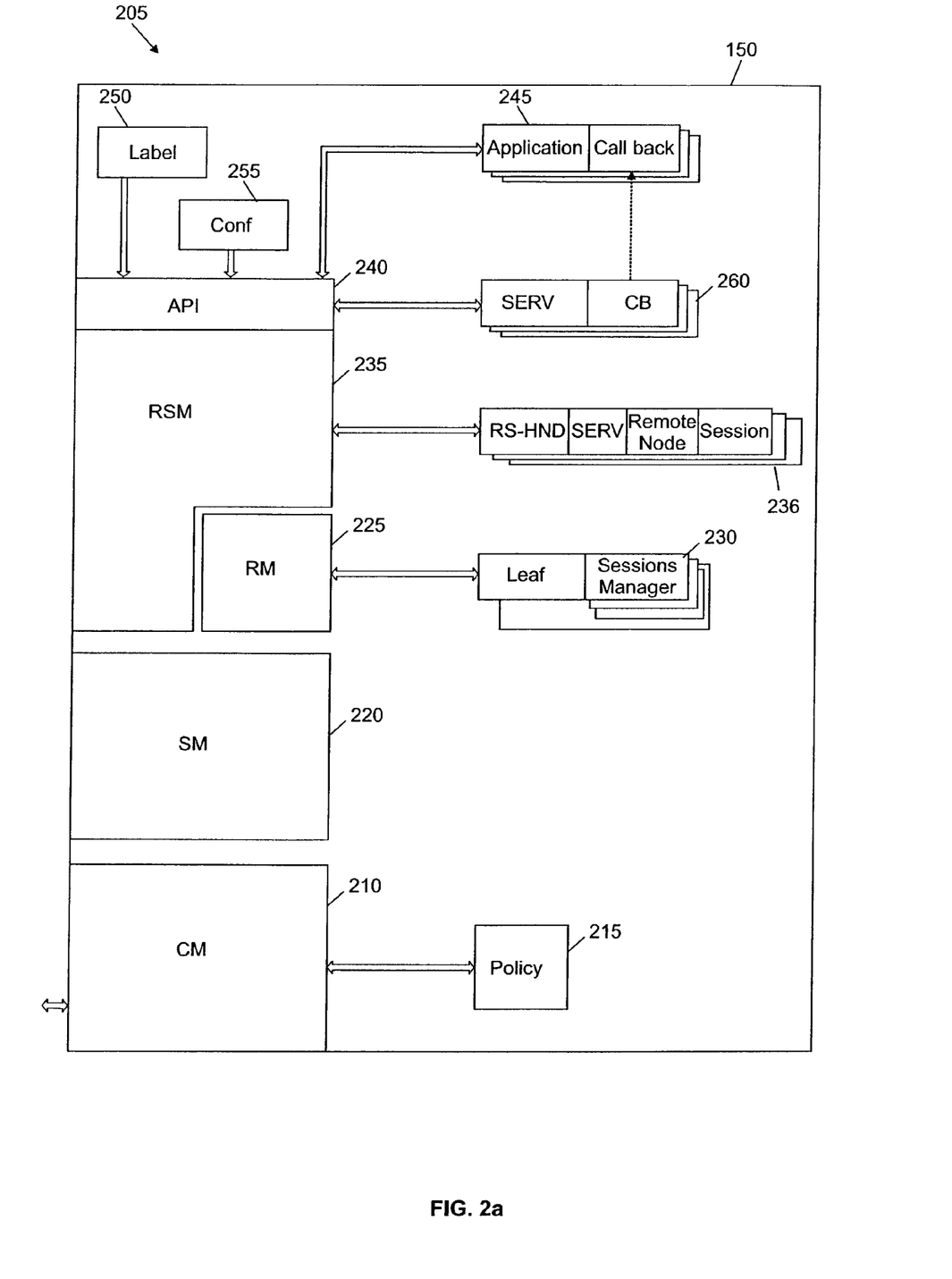
FIG. 2a shows a partial content of a working memory of the computer.

Moving to FIG. 2a, a partial content of the working memory 150 of the computer in operation is shown; the information (programs and data) is typically stored on the hard-disk and loaded (at least partially) into the working memory when the programs are running, together with an operating system and other application programs (not shown in the figure). The programs are initially installed onto the hard disk from CD-ROM.

A stack 205 processes a set of protocol layers (or levels) working together for defining network communication. Each layer of the stack 205 uses the layer beneath it and provides a service for the layer above; the computers of the system are actually linked only at the very lowest layer, but can be regarded as being connected at each higher layer by virtue of the services provided by the lower layers. The stack 205 implements a peer-to-peer communication scheme between generic entities running on different computers. Each entity is considered to communicate with a corresponding entity (its peer) in the same layer on another computer (via the link provided by the lower layers).

Each layer of the stack 205 implements a specific abstraction. In particular, a lowest layer (connection manager, or CM) 210 manages the actual transfer of data through a single point-to-point connection between two adjacent computers. The connection is agnostic to the meaning of the data; in other words, data to be transmitted over the connection has no meaning for this layer and it is sent as raw data (without being neither filtered nor interpreted). The connection manager 210 further implements the connection policy with the adjacent computer, using a memory structure 215 that defines which computer(s) may initiate any connection. Moreover, the connection manager ensures holding of the connection; particularly, whenever a connection is dropped by the respective firewall (because of a low traffic), the connection is automatically re-established (according to the connection policy).

A middle layer (sessions manager, or SM) 220 multiplexes multiple sessions over the connection. Each session consists of a lasting communication between two entities running on adjacent computers (that is, exploiting an actual underlying connection). At this level the data is broken-down in several packets, which are transmitted one after another. This technique is employed since the data to be transmitted is available over the time; moreover, it prevents a session from taking over a connection completely. The data is formatted using a multiplexing protocol, such as the HTTP, the BEEP, or a proprietary one.

A further layer (routing manager, or RM) 225 exploits the sessions manager 220 for building a routing table 230 dynamically. The computers are logically organised in a tree (irrespective of the actual topology of the system). Each relay is associated with an intermediate node of the tree; an endpoint proxy is associated with a root (at one end of the system), whereas each gateway proxy is associated with a leaf (at another end of the system). In this way, each node of the tree (save for the root) has a single parent, and each node of the tree (save for a leaf) has one or more children. The routing table 230 stores, for each leaf (identified by a respective label), a handle of the instance of the sessions manager 220 controlling the communication with the child from which the leaf may be reached in the tree.

A highest layer (routed sessions manager, or RSM) 235 implements routed sessions between two non-adjacent computers, or nodes, at opposite ends of the system (a root and a leaf of the tree). A routed session consists of a virtual session, which exploits multiple sessions along an end-to-end path between the two nodes. The routed sessions manager 235 exploits the sessions manager 220 to let the data navigate through the firewalls, and it exploits the routing manager 225 to pass the data correctly from source to destination (moving the data from one node to another until they eventually reach the destination). The routed sessions manager 235 controls a routed session table 236 that stores a record for each routed session; the record includes a handle RS_HND of the routed session, a field SERV identifying the type of service implemented by the routed session (such as system management or remote control), the label of the remote node, and a handle of the session(s) implementing the routed session in the node.

The routed sessions manager 235 provides an application program interface (API) 240 for one or more applications 245 running on the computer. The API 240 consists of a series of functions, which are called by the applications 245 (without needing to know any further detail of the lower layers); two further functions are used by a communication service to instantiate and to destroy the routed sessions manager 235. A variable 250 stores a label of the node (NULL for the root and the leaves); moreover, a buffer 255 stores opaque configuration information of the node (for example, identifying its parent and children). This information is exploited during initialisation of the stack 205 (with the opaque configuration information that is directly transmitted by the routed sessions manager 235 to the lower layers without being used).

The routed sessions manager 235 further controls a registration table 260, which is formed by a record for each application 245 that has registered to the routed sessions manager 235. The record includes a field storing the identifier SERV of the service the application implements, and a field CB pointing to a callback function that is used to handle the service. The callback function has a pre-set external format (signature), which defines the parameters that are passed to the callback function when it is called. Particularly, the parameters of the callback function are interpreted (in the order) as the handle RS_HND of the routed session, a constant defining a command CMD received from the remote peer, the label LB of the node of the remote peer requesting the service, the identifier of the requested service SERV, a variable PL for passing the data transmitted from the remote peer (a payload), and a variable LEN specifying the length of the payload.

Figure 2B:
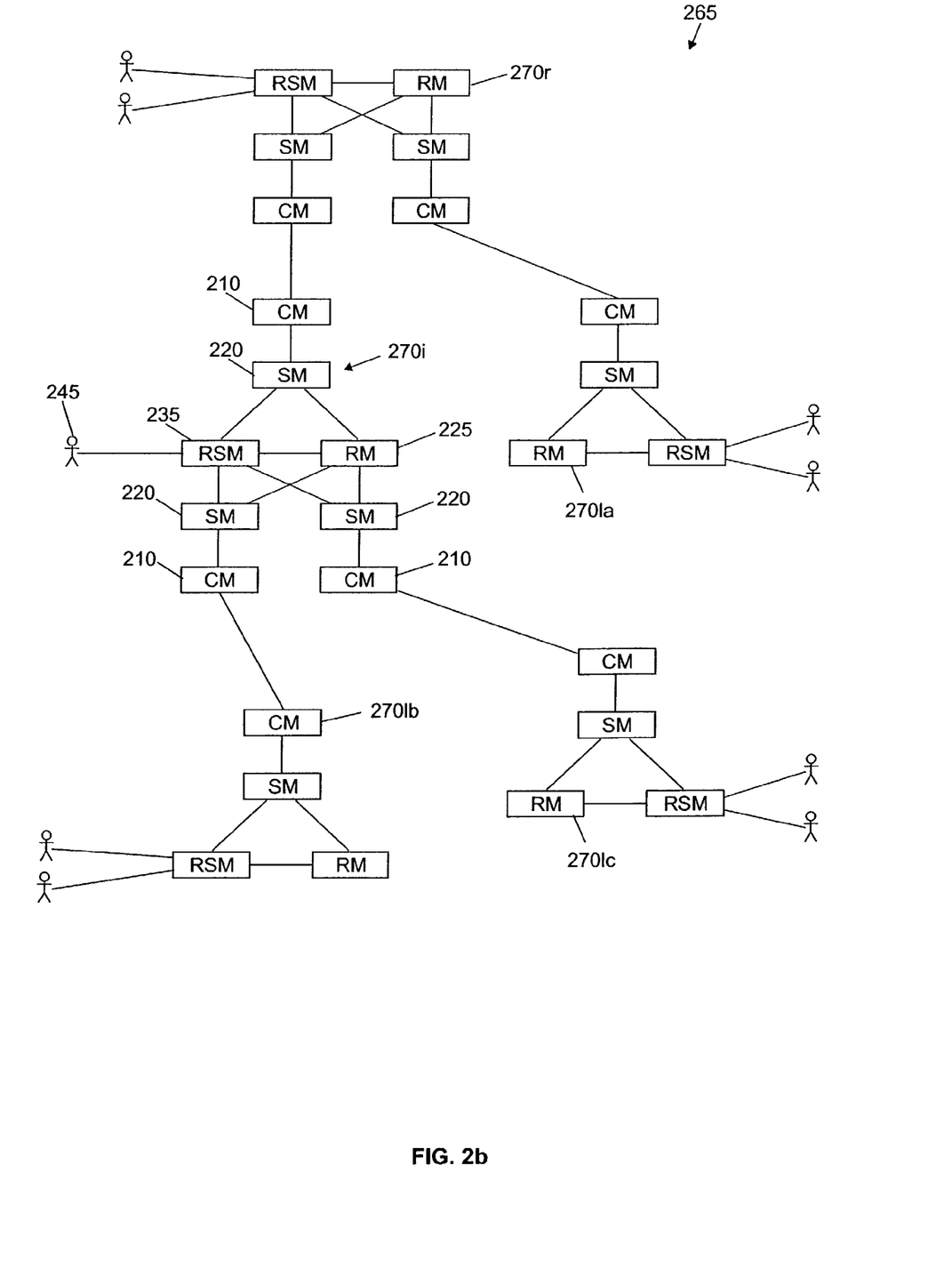
FIG. 2b depicts a collaboration diagram of the system.

With reference now to FIG. 2b, a collaboration diagram shows how the layers described above fit in the system. The computers are logically organised in a tree 265 having a root 270r (the endpoint proxy), an intermediate node 270i attached to the root (a relay), and three leaves 2701a, 201b, 2701c (gateway proxies); the leaf 2701a is directly connected to the root 270r, whereas the leaves 2701b and 2701c are attached to the intermediate node 270i.

One or more applications 245 (such as the endpoint proxy, gateway proxy, and relay management programs, or remote control programs) share the same instance of the routed sessions manager 235 as users on each node (single-tone). The routed sessions manager 235 exploits a single instance of the routing manager 225. A different instance of the sessions manager 220 (which is used both by the routed sessions manager 235 and the routing manager 225) and a corresponding different instance of the underlying connection manager 210 are exploited for controlling the communication between each node and the respective parent and children.

Similar considerations apply if the programs and data are structured in a different manner, if the stack has additional layers, if different multiplexing protocols are employed, if the routing table is replaced with an equivalent structure, if the computers are identified in a different manner, if different information is used to initialise the routed sessions manager, if the callback function has another format, if other services are supported, if the tree has a different structure, if the computers are mapped on the tree in a different manner, and the like. Alternatively, each application exploits a corresponding instance of the routed sessions manager, each session is multiplexed on two or more point-to-point connections, or the connection manager encrypts the data (for example when the data is formatted using the SSL protocol).

Figure 3:
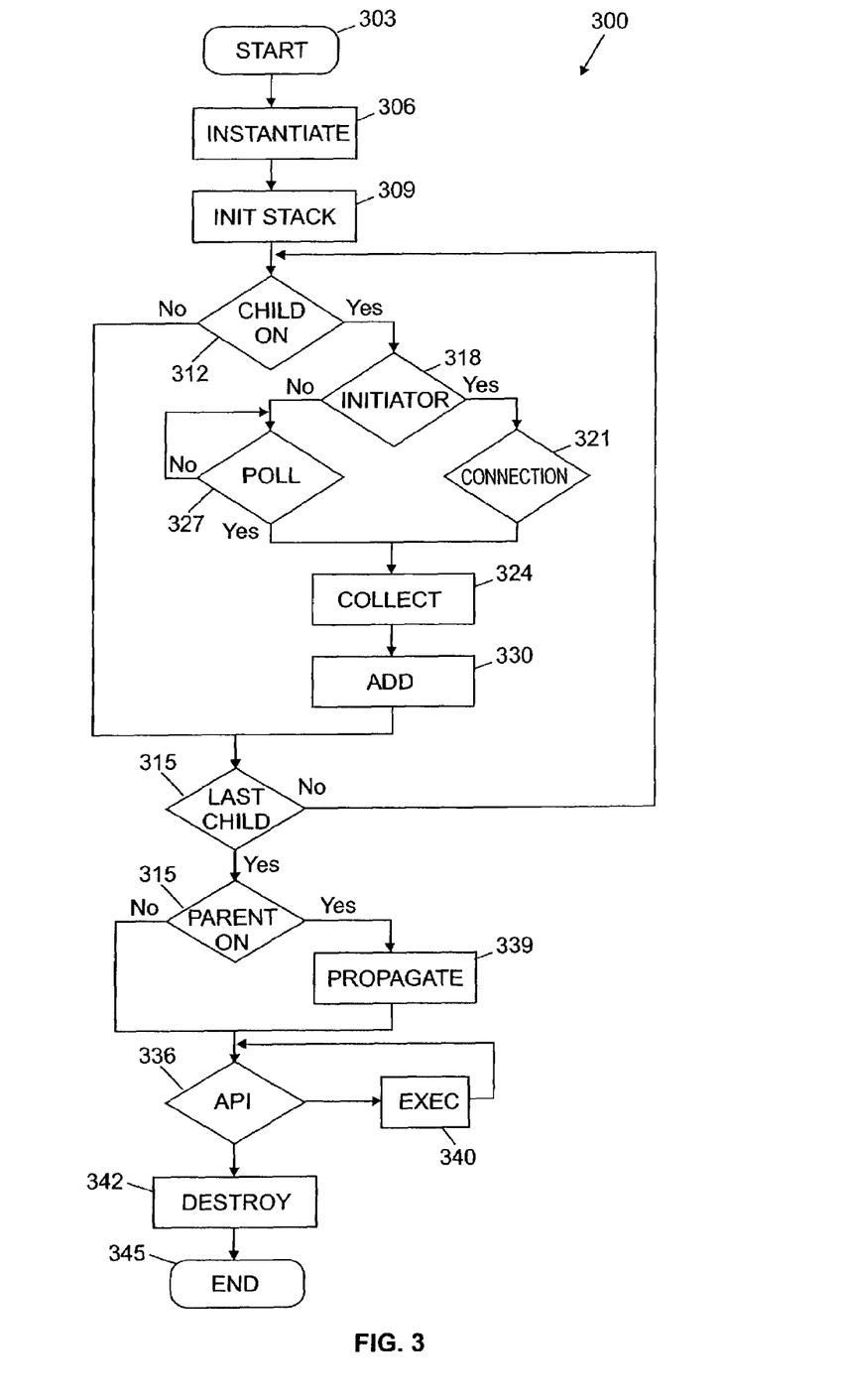
FIG. 3 illustrates the logic of a method used for transmitting information across multiple firewalls of the system.

As shown in FIG. 3, whenever a generic node is turned on, a method 300 is performed. The method starts at block 303 and then passes to block 306, wherein a routed sessions manager instantiate function is called. The function has two parameters, which are used to pass the label of the node and a pointer to the opaque configuration information. This function causes the whole stack to be initialised at block 309. Moving to block 312, a test is performed to determine whether a first child is active. If not, the method descends into block 315 (described in the following).

Conversely, the connection manager checks the connection policy with the current child at block 318. If the connection is bi-directional, the node initiates the connection with the child at block 321; the method then continues to block 324 (described in the following). Conversely, if the node cannot initiate the connection the method enters an idle loop at block 327, waiting to be polled by the child. As soon as the child has initiated the connection, the method descends into block 324. Considering now block 324, the routing manager collects the routing table from the child. The information so obtained is added to the routing table of the node at block 330. The method then continues to block 315.

A test is performed at block 315 to determine whether a last child has been processed. If not, the method returns to block 312 for collecting the routing table from a further child. Conversely, the method verifies at block 333 whether the parent is active. Is not, the method descends into block 336 (described in the following). On the contrary, the node likewise transmits its routing table to the parent at block 339; the transmitted information is added to the routing table of the parent, and is then propagated along the tree up to the root. The method then descends into block 336.

Considering now decision block 336, any function called by the applications running on the node causes the stack to process the corresponding request at block 340. The method then returns to block 336, waiting for the call of a new function. When the stack is not needed any longer, the method exits the above-described loop and passes to block 442; a routed sessions manager destroy function is called (without any parameter), so as so free the routed sessions manager. The method then ends at the final block 445.

Figure 4:
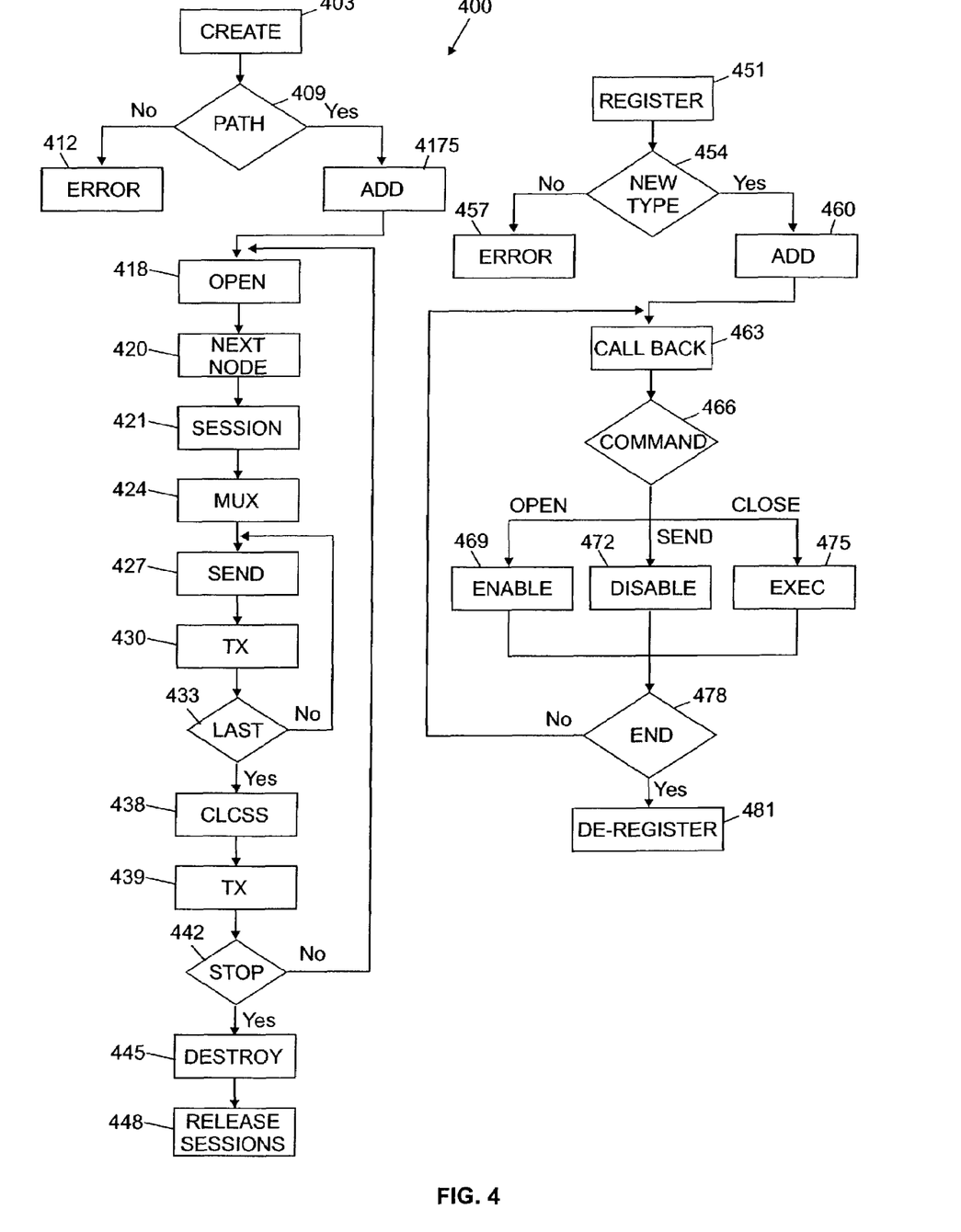
FIG. 4 shows a flow of operation of the system.

Moving now to FIG. 4, a flow 400 of operation of the system is illustrated. An application running on the root or a leaf of the tree creates a routed session (with a remote peer) calling a routed session create function at block 403. The function has two parameters, which are used to pass the label of the node of the remote peer LB and the identifier of the service SERV the application expects the remote peer is registered for; the function returns the handle of the routed session RS_HND to the application. Descending into block 409, the routing manager determines whether a path for reaching the remote node is available in the tree (that is, whether the label of the remote node LB is included in the routing table). If not, the method enters an error conditions at block 412.

Conversely, a new record is added to the routed session table at block 415 (inserting the handle of the routed session RS_HND and the label of the remote node LB). The routed session is now available for use; at first, the routed session is opened at block 418 calling a routed session open function. The function has three parameters, which are used to pass the handle of the routed session RS_HND, the payload PL, and its length LN. A corresponding open message is created, inserting the handle of the routed session RS_HND, a command CMD=open, the label of the remote node LB, the identifier of the requested service SERV (extracted from the corresponding record of the routed session table), the payload LD and its length LN; the open message is then transmitted to the remote node (identified by the label LB extracted from the corresponding record of the routed session table). Particularly, the next adjacent node in the path to the remote node is identified at block 420 using the routing table. A session is then established at block 421 with the adjacent node, and the handle of the session is inserted into the corresponding record of the routed session table. Moving to block 424, the open message is multiplexed over the respective connection. The same steps described above are repeated in each intermediate node of the path to the remote node, until the open message has reached the remote node.

With reference now to block 427, a data send function is used by the application to transmit data to the remote peer. The function has three parameters, which are used to pass the handle of the routed session RS_HND, the payload PL, and its length LN. A corresponding send message is created, inserting the handle of the routed session RS_HND, a command CMD=send, the label of the node LB, the identifier of the requested service SERV (extracted from the routed session table), the payload LD and its length LN. The send message is then transmitted to the remote node at block 430, exploiting the respective sessions in each node along the path to the remote node (as defined in the corresponding record of the routed session table). A test is made in decision block 433 to determine whether further data must be transmitted. If so, the method returns to block 427 for repeating the operations described above.

Conversely, the routed session is closed at block 436 calling a routed session close function. The function has three parameters, which are used to pass the handle of the routed session RS_HND, the payload PL, and its length LN. A corresponding close message is created, inserting the handle of the routed session RS_HND, a command CMD=close, the label of the node LB, the identifier of the requested service SERV (extracted from the routed session table), the payload LD and its length LN. The close message is then transmitted to the remote node at block 439, exploiting the corresponding sessions in each node along the path.

Considering now block 442, if the routed session is still needed, the method returns to block 418 (for opening the routed session again). On the contrary, a routed session destroy function is called at block 445. The function has a single parameter, which is used to pass the handle of the routed session RS_HND. The flow ends at block 448, wherein the record identified by the routed session handle RS_HND is deleted from the routed session table and a corresponding destroy message is transmitted to the remote node, thereby causing all the sessions in the path to the remote node to be released.

At the same time, the remote peer registers to the routed sessions manager at block 451, using a routed session register function. The function has two parameters, which are used to pass the identifier of the service SERV the application wants to implement and the pointer CB to the respective callback function. A test is made at block 454 to verify whether the service SERV is already in use. If so, the method enters an error condition at block 457.

Conversely, the application is registered at block 460 inserting a corresponding new record into the registration table. Considering now block 463, whenever a message is received from a remote peer the callback pointer CB associated with the identifier of the service SERV (specified in the message) is retrieved from the registration table. The callback function is then invoked, passing the parameters extracted from the received message (routed session handle RS_HND, command CMD, label of the remote node LB, identifier of the service SERV, payload PL and its length LEN). The callback function checks the command CMD at block 466. If the command is CMD=open the routed session is enabled at block 469, whereas if the command is CMD=close the routed session is disabled at block 472 (so as it is not longer valid); otherwise, if the command is CMD=send the requested operations are executed at block 475. In every case, the method descends into decision block 478. If the routed session is still needed, the method returns to block 463 waiting for a new message from the remote peer. Conversely, the flow ends at block 481, wherein the application de-registers for the service.

Similar considerations apply if equivalent flows are envisaged, if each application registers for more services or creates more routed sessions (for the same or different services) at the same time, if the functions implemented by the API of the routed sessions manager have a different format, if additional functions are provided, and the like. For example, a further function is used to signal an error to the remote peer (implying the automatic closure of the routed session for both the peers); a still further function makes it possible to send data in one-shot, without the open, send and close sequence described above (with the routed session that is not more valid when the remote peer receives the corresponding message).

More generally, the present invention provides a method of transmitting information across a plurality of firewalls. The information is transmitted between one or more first computers and one or more second computers separated by the firewalls, with a relay computer that is interposed between each pair of firewalls. The method starts with the step of providing a communication stack with a plurality of layers on each computer. A virtual session is established between a first entity running on a first computer and a second entity running on a second computer using a first one of the layers. The virtual session is implemented through a plurality of sessions each one between two adjacent computers along a path from the first computer to the second computer; this step is carried out using a second one of the layers underneath the first layer. Each session is then multiplexed on a point-to-point connection crossing the corresponding firewall, using a third one of the layers underneath the second layer.

The method of the invention strongly simplifies communication between computers separated by multiple firewalls.

The devised solution allows communications across the multiple firewalls to be managed in a transparent manner. Moreover, the method of the invention is independent of the protocols or technologies that are used for the firewalls.

Particularly, the advantages of the layered communication stack is that the mode of passing information from one layer to another is specified clearly as part of a protocol suite, and changes within a layer are prevented from affecting the other layers. This greatly simplifies the task of designing and maintaining the whole communication stack.

The preferred embodiment of the invention described above offers further advantages. Particularly, the routing manager dynamically builds the routing table; the routing table only stores a list of the computers that can be reached from each adjacent computer.

This feature strongly improves the security of the system; in fact, any security breach in one of the computers does not allow the intruder to acquire information about the routing scheme of the whole system.

Advantageously, the routing table is used to create a session from each computer to the next one along the path from source to destination.

This mechanism permits to establish multi-hop communications through the system in a very effective manner.

Preferably, the routing scheme consists of a tree.

The proposed structure is quite simple, but at the same time effective.

As a further improvement, the routing tables are built propagating the information from each node (as soon as it is activated) along the tree up to the root.

In this way, the routing tables are always kept up to date, without the need of any external intervention.

However, the solution of the invention leads itself to be carried out even using static routing tables, routing the messages in a different manner (also without storing any information in the intermediate nodes), logically organising the computers with a different scheme (for example a mesh), building the routing tables in a different manner (for example analysing the system periodically), and the like.

As a further advantage, each virtual session is established registering a peer for a desired service and then opening the virtual session from the remote peer.

The proposed solution is very flexible, and allows multiple services to the supported in the system.

Preferably, the registration involves associating a callback function to the service.

In this way, any operation requested from the remote peer may be executed simply calling the callback function and passing the corresponding command.

Particularly, the callback function is used for sending data to the remote peer.

The proposed feature makes it possible to manage the virtual session in a very simple manner.

Alternatively, the system does not support multiple services, the virtual session is established in a different manner (even without any registration), a different flow of operation is envisaged (for example with data sent in one-shot), different functions are associated with each command, and the like.

In a preferred embodiment of the invention, the connection manager simulates a bi-directional initiating capability of each connection for the sessions manager.

The proposed feature makes the connection policy transparent to the applications.

However, the solution of the invention is also suitable to be implemented in a system wherein all the connections are bi-directional, or even without any connection policy management capability.

Advantageously, the solution according to the present invention is implemented with a computer program (software) application, which is provided on CD-ROM. The application consists of a communication stack installed on each computer of the system.

Moreover, it should be noted that each communication stack is suitable to be put on the market even as a stand-alone product, in order to be installed on a new computer to be added to an existing system.

Alternatively, the communication stack is provided on floppy-disk, is pre-loaded onto the hard-disk, or is stored on any other computer readable medium, is sent to the computer through a network (typically the INTERNET), is broadcast, or more generally is provided in any other form directly loadable into a working memory of the computer. However, the method according to the present invention leads itself to be carried out even with a hardware structure, for example integrated in a chip of semiconductor material.

Naturally, in order to satisfy local and specific requirements, a person skilled in the art may apply to the solution described above many modifications and alterations all of which, however, are included within the scope of protection of the invention as defined by the following claims.

The invention claimed is:

1. A method of transmitting information across a plurality of firewalls between a first computer and a second computer separated by the firewalls, wherein a relay computer is interposed between a pair of firewalls within the plurality of firewalls, the method comprising:

provi­ding a communication stack with a plurality of layers on each computer;

establishing a routed virtual session between a first application running on the first computer and a second application running on the second computer using a routed session manager layer, wherein the second application registers for a unique service by creating an entry in a registration table controlled by a routed session manager layer at the second computer, wherein registering the second application comprises associating, in an application program interface in the second computer, a callback function to the service;

creating an entry for the routed virtual session in a routed session table controlled by the routed session manager layer, wherein the entry comprises a first routed session handle identifying the routed virtual session at the first computer, an identifier of the service implemented by the routed virtual session, a label identifying the second computer, and a second routed session handle identifying a routed virtual session implementing the routed virtual session in the second computer;

opening, by the first application via an application program interface in the first computer, the routed virtual session thereby causing a corresponding open message comprising an identifier of the service to be transmitted to the second computer;

requesting transmission of data from the first application using the routed virtual session, thereby causing a corresponding send message comprising the data and the identifier of the service to be transmitted to the second computer;

implementing the routed virtual session through a communications session between two adjacent computers along a path from the first computer to the second computer using a connection manager layer underneath the routed session manager layer;

breaking down data in the routed virtual session into a plurality of packets in a session managing layer underneath the routed session manager layer; and multiplexing, using the session manager layer, a plurality of virtual sessions on the communications session crossing a corresponding firewall such that the plurality of packets are available over time and the routed virtual session does not dominate the communications session.

2. The method according to claim 1, wherein a plurality of computers comprising the first computer, the second computer, and the relay computer are logically organised according to a routing scheme, the method further comprising dynamically building a routing structure on each computer within the plurality of computers using a routing manager layer between the routed session manager layer and the session manager layer, the routing structure associating each adjacent computer with the plurality of computers reachable through the routing scheme.

3. The method according to claim 2, wherein implementing the routed virtual session through the communications session comprises on each computer along the path from the first computer to the second computer:

identifying a next computer in the path using the routing structure; and establishing a session with the next computer.

4. The method according to claim 2, wherein the routing scheme consists of a tree having a plurality of nodes including a root associated with a first computer, a plurality of leaves each one associated with a second computer, and at least one intermediate node associated with a relay computer, each node different from the root having a single parent and each node different from a leaf having at least one child.

5. The method according to claim 1, wherein the communications session has a unidirectional initiating capability, the method further comprising simulating a bi-directional initiating capability of the communications session by the routed session manager layer for the connection manager layer.

6. A method of transmitting information across a plurality of firewalls between a first computer and a second computer separated by the firewalls, wherein a relay computer is interposed between a pair of firewalls within the plurality of firewalls, the method comprising:

providing a communication stack with a plurality of layers on each computer;

dynamically building a routing structure on each computer within the plurality of computers using a routing manager layer between the routed session manager layer and the session manager layer, the routing structure associating each adjacent computer with the plurality of computers reachable through the routing scheme, wherein the routing scheme consists of a tree having a plurality of nodes including a root associated with a root computer, a plurality of leaves each one associated with an endpoint computer, and at least one intermediate node associated with a relay computer, each node different from the root having a single parent and each node different from a leaf having at least one child, wherein dynamically building the routing structure comprises upon activation of each computer:

collecting the routing structure from each child if active;

updating the routing structure stored on the activated computer according to the collected routing structure; and propagating the updated routing structure from the activated computer along the tree up to the root if the parent is active;

establishing a routed virtual session between a first application running on the first computer and a second application running on the second computer using a routed session manager layer;

implementing the routed virtual session through a communications session between two adjacent computers along a path from the first computer to the second computer using a connection manager layer underneath the routed session manager layer;

breaking down data in the routed virtual session into a plurality of packets in a session managing layer underneath the routed session manager layer; and multiplexing, using the session manager layer, a plurality of virtual sessions on the communications session crossing a corresponding firewall such that the plurality of packets are available over time and the routed virtual session does not dominate the communications session.

7. The method of claim 6, wherein establishing a routed virtual session between the first application running on the first computer and the second application running on the second computer comprises:

creating an entry for the routed virtual session in a routed session table controlled by the routed session manager layer, wherein the entry comprises a first routed session handle identifying the routed virtual session at the first computer, an identifier of the service implemented by the routed virtual session, a label identifying the second computer, and a second routed session handle identifying a routed virtual session implementing the routed virtual session in the second computer.

8. The method of claim 7, wherein establishing a routed virtual session between the first application running on the first computer and the second application running on the second computer comprises:

determining whether a path for reaching the second computer is available in the routing structure.

9. The method of claim 8, wherein determining whether a path for reaching the second computer is available in the routing structure comprises determining whether the label identifying the second computer exists in the routing structure.

10. The method of claim 7, wherein the second application registers for a unique service by creating an entry in a registration table controlled by a routed session manager layer at the second computer, wherein registering the second application for a unique service comprises associating, in an application program interface at the second computer, a callback function to the service.

11. The method of claim 10, further comprising:

opening, by the first application via an application program interface at the first computer, the routed virtual session thereby causing a corresponding open message comprising an identifier of the service to be transmitted to the second computer; and     requesting transmission of data from the first application using the routed virtual session, thereby causing a corresponding send message comprising the data and the identifier of the service to be transmitted to the second computer.

12. The method of claim 11, further comprising:

activating, via the application program interface at the second computer, the callback function in response to the open message.

13. The method of claim 11, further comprising:

activating, via the application program interface at the second computer, the callback function in response to the send message, the data included in the send message being passed to the callback function.

14. The method of claim 11, wherein the send message comprises a payload and a length value.

* * * * *